United States Patent
Drepper (10) Patent No.: US 8,104,034 B2
(45) Date of Patent: Jan. 24, 2012

(54) PURPOSE DOMAIN FOR IN-KERNEL VIRTUAL MACHINE FOR LOW OVERHEAD STARTUP AND LOW RESOURCE USAGE

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1102 days.

(21) Appl. No.: 11/289,406

(22) Filed: Nov. 30, 2005

(65) Prior Publication Data

US 2007/0169024 A1    Jul. 19, 2007

(51) Int. Cl.
*G06F 9/455* (2006.01)
*G06F 9/44* (2006.01)
*G06F 9/45* (2006.01)
*G06F 9/46* (2006.01)
*G06F 3/00* (2006.01)
*G06F 13/00* (2006.01)

(52) U.S. Cl. ............ 718/1; 717/118; 717/140; 717/148; 717/136; 719/310; 719/319

(58) Field of Classification Search .............. 718/1, 107; 719/310, 319; 717/118, 148, 154, 136, 140
See application file for complete search history.

(56) References Cited

U.S. PATENT DOCUMENTS

| | | | | |
|---|---|---|---|---|
| 5,815,415 A | * | 9/1998 | Bentley et al. ..................... | 703/4 |
| 5,987,523 A | * | 11/1999 | Hind et al. ..................... | 709/245 |
| 6,021,469 A | * | 2/2000 | Tremblay et al. ............ | 711/125 |
| 6,075,938 A | * | 6/2000 | Bugnion et al. ................ | 703/27 |
| 6,321,377 B1 | * | 11/2001 | Beadle et al. ................ | 717/148 |
| 6,324,685 B1 | * | 11/2001 | Balassanian ................... | 717/118 |
| 6,397,242 B1 | * | 5/2002 | Devine et al. ..................... | 718/1 |
| 6,510,352 B1 | * | 1/2003 | Badavas et al. ................. | 700/19 |

(Continued)

OTHER PUBLICATIONS

Virtual machine monitors: current technology and future trends by Rosenblum, M.; Garfinkel, T.; IEEE Journal, vol. 38, Issue 5, May 2005 pp. 39-47.*

(Continued)

*Primary Examiner* — Emerson Puente
*Assistant Examiner* — Charles Swift
(74) *Attorney, Agent, or Firm* — Lowenstein Sandler PC (57) ABSTRACT

Embodiments of the present invention provide an architecture for securely and efficiently executing byte code generated from a general programming language. In particular, a computer system is divided into a hierarchy comprising multiple types of virtual machines. A thin layer of software, known as a virtual machine monitor, virtualizes the hardware of the computer system and emulates the hardware of the computer system to form a first type of virtual machine. This first type of virtual machine implements a virtual operating domain that allows running its own operating system. Within a virtual operating domain, a byte code interpreter may further implement a second type of virtual machine that executes byte code generated from a program written in a general purpose programming language. The byte code interpreter is incorporated into the operating system running in the virtual operating domain. The byte code interpreter implementing the virtual machine that executes byte code may be divided into a kernel component and one or more user level components. The kernel component of the virtual machine is integrated into the operating system kernel. The user level component provides support for execution of an applet and couples the applet to the operating system. In addition, an operating system running in a virtual operating domain may be configured as a special purpose operating system that is optimized for the functions of a particular byte code interpreter.

19 Claims, 7 Drawing Sheets

U.S. PATENT DOCUMENTS

| | | | | |
|---|---|---|---|---|
| 6,513,158 | B1 * | 1/2003 | Yogaratnam | 717/166 |
| 6,571,274 | B1 | 5/2003 | Jacobs et al. | |
| 6,675,230 | B1 | 1/2004 | Lewallen | |
| 6,751,274 | B2 * | 6/2004 | Kim et al. | 375/346 |
| 6,854,123 | B1 | 2/2005 | Lewallen | |
| 6,934,761 | B1 | 8/2005 | Curtis | |
| 6,957,439 | B1 | 10/2005 | Lewallen | |
| 6,961,941 | B1 * | 11/2005 | Nelson et al. | 719/319 |
| 7,020,738 | B2 * | 3/2006 | Neiger et al. | 711/6 |
| 7,035,963 | B2 * | 4/2006 | Neiger et al. | 711/6 |
| 7,039,904 | B2 * | 5/2006 | Sokolov | 717/147 |
| 7,401,230 | B2 * | 7/2008 | Campbell et al. | 713/190 |
| 7,409,487 | B1 | 8/2008 | Chen et al. | |
| 7,478,373 | B2 * | 1/2009 | Bond et al. | 717/138 |
| 7,480,908 | B1 * | 1/2009 | Tene et al. | 718/1 |
| 7,908,653 | B2 * | 3/2011 | Brickell et al. | 726/22 |
| 2002/0099863 | A1 * | 7/2002 | Comeau et al. | 709/310 |
| 2003/0097360 | A1 * | 5/2003 | McGuire et al. | 707/8 |
| 2003/0126187 | A1 * | 7/2003 | Won et al. | 709/107 |
| 2003/0149966 | A1 * | 8/2003 | McGuire | 717/148 |
| 2003/0149967 | A1 * | 8/2003 | Kamada et al. | 717/148 |
| 2003/0163711 | A1 | 8/2003 | Grawrock | |
| 2003/0204838 | A1 | 10/2003 | Caspole et al. | |
| 2004/0064813 | A1 * | 4/2004 | Neiger et al. | 718/1 |
| 2004/0064819 | A1 | 4/2004 | LaVoie et al. | |
| 2004/0158830 | A1 * | 8/2004 | Chung et al. | 718/1 |
| 2004/0216096 | A1 * | 10/2004 | Messer et al. | 717/154 |
| 2005/0188382 | A1 * | 8/2005 | Nagendra et al. | 719/328 |
| 2005/0262138 | A1 * | 11/2005 | Hartel et al. | 707/103 R |
| 2006/0005189 | A1 * | 1/2006 | Vega et al. | 718/1 |
| 2006/0048114 | A1 * | 3/2006 | Schmidt | 717/148 |
| 2006/0064545 | A1 * | 3/2006 | Wintergerst | 711/130 |
| 2007/0083862 | A1 * | 4/2007 | Wooldridge et al. | 718/1 |
| 2009/0172665 | A1 | 7/2009 | Tene et al. | |

OTHER PUBLICATIONS

"Rethinking the Design of Virtual Machine Monitors" by Andrew Whitaker et al, IEEE Journal, May 2005, p. 57-62.*
Whitaker et al, "Scale and Performance in the Denali Isolation Kernel", 2002, ACM, pp. 195-209.*
Whitaker et al, "Denali: a scalable isolation kernel", 2002, ACM, pp. 10-15.*
Thekkath et al, "Hardware and Software Support for Efficient Exception Handling", 1994, ACM, pp. 110-119.*
Erlingsson et al "Virtual Environment for Unrealiable Extensions", Jun. 2005, pp. 1-11 including cover page.*
U.S. Appl. No. 11/289,401, filed Nov. 30, 2005, Drepper.
U.S. Appl. No. 11/289,402, filed Nov. 30, 2005, Drepper.
Mitchem et al., Using Kernel Hypervisors to Secure Applications. In Proceedings of the 13th Annual Computer Security Applications Conference, Dec. 1997, IEEE Computer Society, p. 175-181.
Santhanam, Towards Linux 2.6, IBM developerWorks, Sep. 23, 2003, pp. 1-19.
KVM: Kernel-based Virtualization Driver, White Paper, Qumranet, 2006, retrieved Feb. 17, 2010 from <http://web.archive.org/web/20070108015503/www.qumranet.com/wp/kvm_wp.pdf, pp. 1-5.
KVM—Kernel Based Virtual Machine, Red Hat, 2009, retrieved Feb. 17, 2010 from <http://www.redhat.com/f/pdf/rhev/DOC-KVM.pdf>, pp. 1-11.

* cited by examiner

PURPOSE DOMAIN FOR IN-KERNEL VIRTUAL MACHINE FOR LOW OVERHEAD STARTUP AND LOW RESOURCE USAGE

CROSS-REFERENCE TO RELATED APPLICATIONS

This application claims priority to U.S. patent application Ser. No. 11/289,402 filed on Nov. 30, 2005, entitled "PURPOSE DOMAIN FOR LOW OVERHEAD VIRTUAL MACHINES," and U.S. patent application Ser. No. 11/289,401 filed on Nov. 30, 2005, entitled "IN-KERNEL VIRTUAL MACHINE FOR LOW OVERHEAD STARTUP AND LOW RESOURCE USAGE," the disclosures of which are incorporated in their entirety by reference herein.

FIELD OF THE INVENTION

The present invention relates generally to applications consisting of byte code generated from a general purpose programming languages and executed by byte code interpreters.

BACKGROUND OF THE INVENTION

Today, there are many applications that are written in general purpose programming languages. A desired characteristic of these applications is platform independence. That is, an application can be written once and executed on multiple computer platforms. With the advent of the Internet and widespread use of web application and browsing, such applications have become widely accepted. For example, languages, such as Java, have become very successful with server-side applications, such as web services, or servlets.

Platform independence for an application written in a general purpose programming language is achieved by compiling the language code "halfway" into an intermediate form known as byte code. A special program, known as a byte code interpreter, runs on the host computer system. The byte code interpreter implements a virtual machine on which the byte code is interpreted. Alternatively the byte code can be translated into usable native code that can be executed by the host computer system. Standardized libraries may also be installed on a host computer system to provide access to features, such as graphics and networking.

Unfortunately, applications that are compiled into byte code suffer from high startup overhead and may consume a large amount of resources during operation. When a user runs multiple Java applications concurrently in different instances of the Java virtual machine (JVM), there tends to be substantial duplication of effort in each JVM. For example, when multiple applications are executed concurrently, each has to load, parse, verify, and create runtime representations of all the applications' classes, even such common ones as java.lang.Object. Application start-up time, memory footprint, and raw execution time are thus negatively impacted. Developers who try to circumvent the problem by using class loaders soon discover that they provide inadequate inter-application isolation and make it difficult to cleanly terminate applications.

Accordingly, it may be desirable to provide systems and methods that can efficiently run interpreted language applications. It may also be desirable to provide systems and methods that can efficiently startup interpreted language applications.

SUMMARY OF THE INVENTION

In accordance with one feature of the invention, a computer comprises a processor and a virtual machine monitor coupled to the processor. The virtual machine monitor is configured to provide a set of virtual operating domains. An operating system is encapsulated within one of the virtual operating domains and is coupled to the processor through the virtual machine monitor. The operating system comprises a kernel and a byte code interpreter, in the kernel, that is configured to implement a general purpose programming language.

In accordance with another feature of the invention, a method of starting an applet on a computer in a new virtual operating domain is provided. Hardware of the computer is accessed through a virtual machine monitor and the virtual machine monitor is configured to create virtual operating domains on demand. When a request to start an applet is received, the virtual machine monitor is instructed to create a virtual operating domain for the applet. An operating system is loaded into the virtual operating domain for the applet. The operating system comprises a byte code interpreter for a general purpose programming language. The applet may then be started in the virtual operating domain.

In accordance with another feature of the invention, a method of starting an applet on a computer in an existing virtual operating domain is provided. Upon receiving a request to start an applet in an existing virtual operating domain, the request to start the applet is communicated to the existing virtual operating domain. A byte code interpreter is running in the kernel of the operating system and is configured to implement a general purpose programming language. The applet is then started in the virtual operating domain.

In accordance with yet another feature of the invention, a method of starting an applet on a computer in an existing virtual operating domain is provided. Upon receiving a request to start an applet in an existing virtual operating domain, the request to start the applet is communicated through an inter-domain communication channel to another virtual operating domain. The other virtual operating domain comprises a byte code interpreter running in the kernel of the operating system and is configured to implement a general purpose programming language. The applet is then started in the existing virtual operating domain.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide an architecture for securely and efficiently executing byte code generated from a general programming language. In particular, a computer system is divided into a hierarchy comprising multiple virtual machines. A thin layer of software, known as a virtual machine monitor, virtualizes the hardware of the computer system and emulates the hardware of the computer system to form a first type of virtual machine. Instances of this first type of virtual machine are here referred to as a virtual operating domain and they each run their own operating system. Within a virtual operating domain, a byte code interpreter may further implement a second type of virtual machine that executes byte code generated from a general purpose programming language.

In some embodiments, the byte code interpreter is incorporated into the operating system running in the virtual operating domain. The byte code interpreter implementing the virtual machine that executes byte code may be divided into a kernel component and one or more user level components. The kernel component of the virtual machine is integrated into the operating system kernel. The user level component provides support for execution of an applet and couples the applet to the operating system. In addition, the kernel may share the same copy of the user level component of the virtual machine with multiple processes in the same virtual operating domain or across other virtual operating domains. Furthermore, an operating system running in a virtual operating domain may be configured as a special purpose operating system that is optimized for the functions of a particular byte code interpreter.

Accordingly, the virtual machine can run efficiently with low overhead because the applet and the kernel may run in the same address space of virtual memory. This architecture may be advantageous over conventional technology, for example, because it uses a function call rather than a system call to access the operating system functionality. System calls have a higher overhead. In addition, because the execution happens in a separate and dedicated virtual operating domain, security of the rest of the system is not compromised by removing the separation between kernel and application.

Reference will now be made in detail to exemplary embodiments of the invention, which are illustrated in the accompanying drawings. Wherever possible, the same reference numbers will be used throughout the drawings to refer to the same or like parts.

Figure 1:
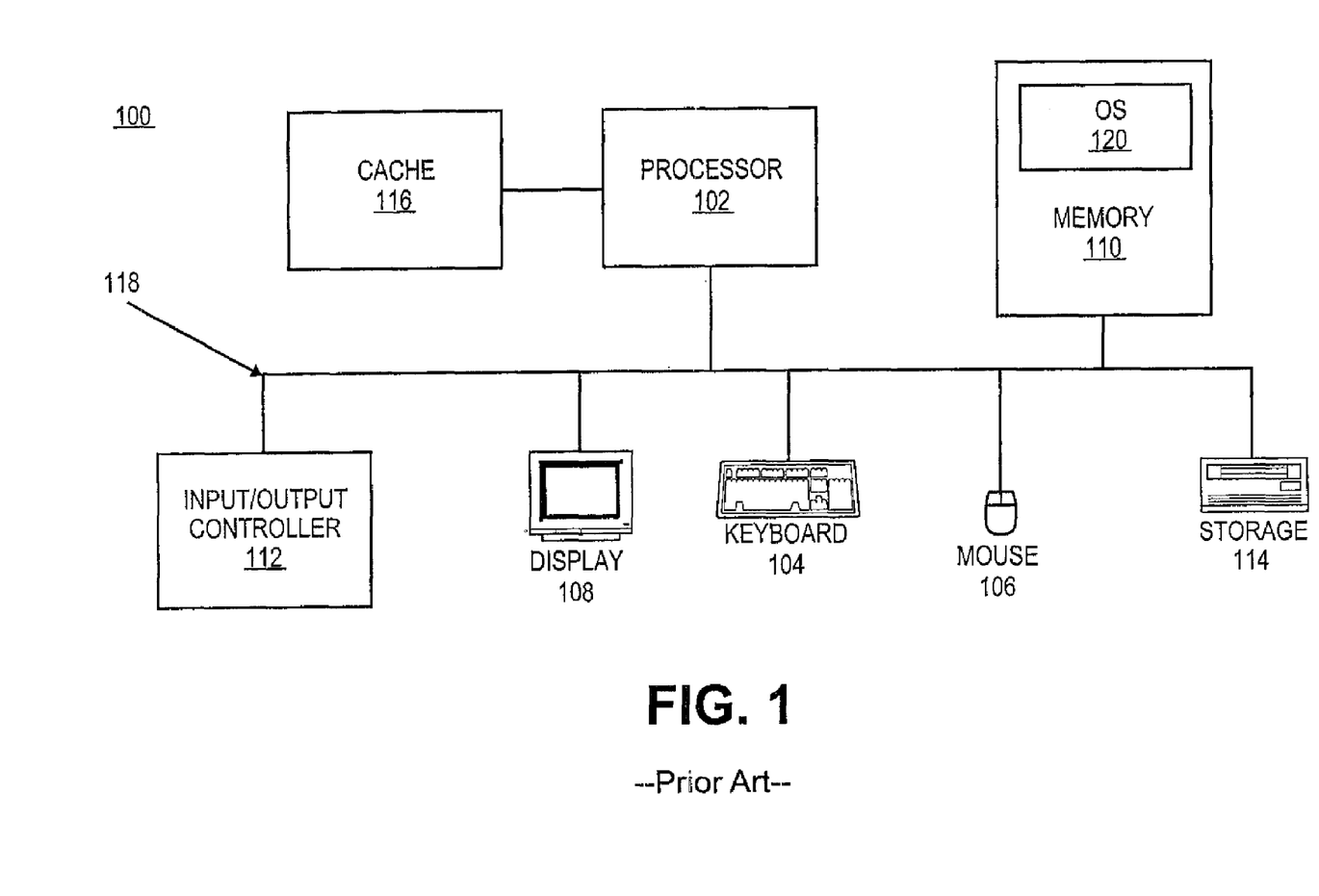
FIG. 1 illustrates a computer system that is consistent with embodiments of the present invention.

FIG. 1 illustrates a computer system 100 that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Figure 2:
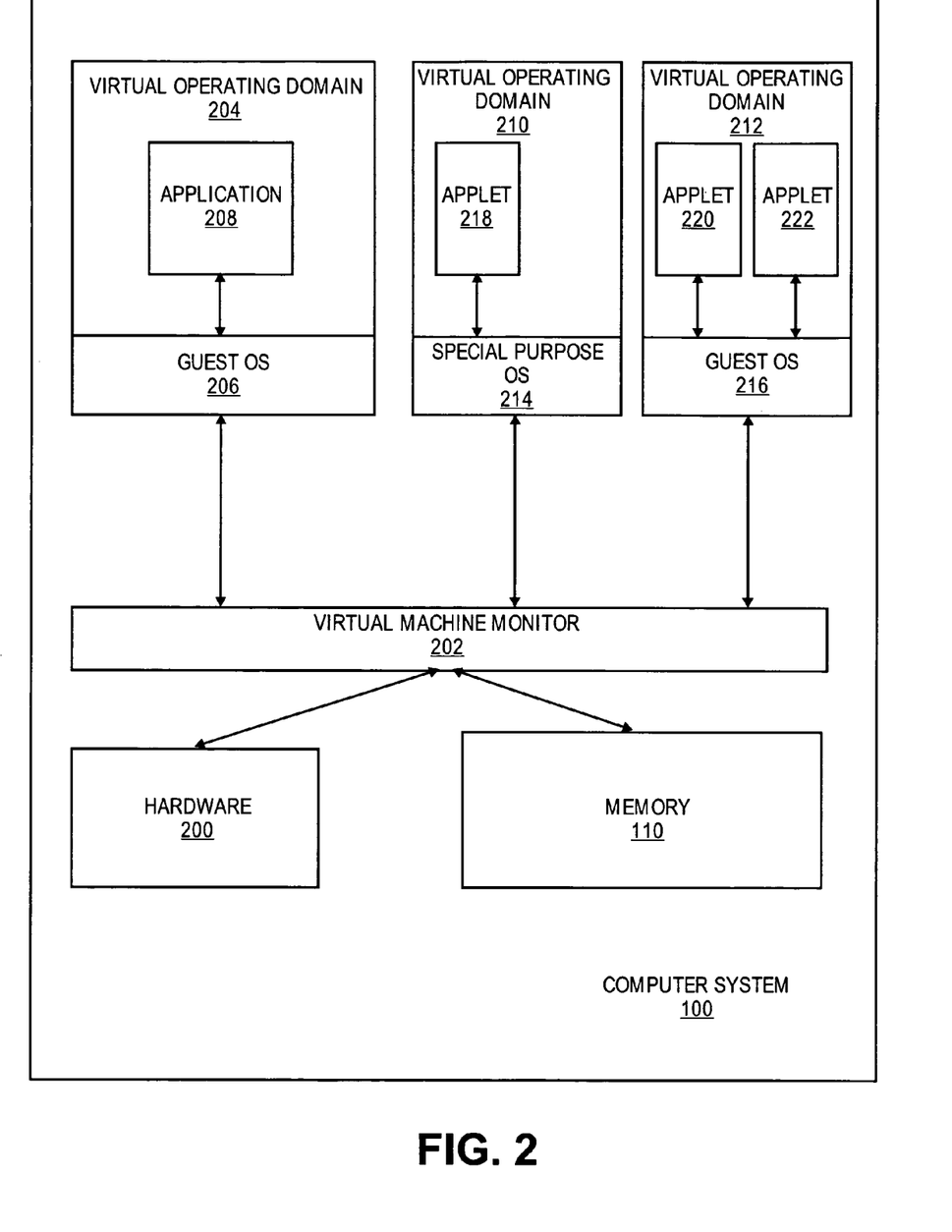
FIG. 2 illustrates a software architecture of the computer system that is in accordance with embodiments of the present invention.

FIG. 2 illustrates a software architecture of computer system 100 that is in accordance with embodiments of the present invention. As shown, system 100 may comprise hardware 200, which has been previously described above with reference to FIG. 1. In addition, system 100 may comprise a virtual machine monitor 202, and virtual operating domains 204, 210, and 212 that interact with memory 110.

Hardware 200 represents the components of hardware and firmware described above with reference to FIG. 1, such as processor 102, keyboard 104, mouse 106, display 108, input/output controller 112, storage 114, and the like. As noted, such hardware and firmware are well known to those skilled in the art.

Virtual machine monitor 202 is a layer of software that runs directly on hardware 200 of computer system 100 and controls access to/from memory 110. In the embodiment shown in FIG. 2, virtual machine monitor 202 runs directly on hardware 200 in the most privileged mode offered by processor 102. Essentially, virtual machine monitor 202 is a small operating system. In some embodiments, virtual machine monitor 202 may be implemented using known software, such as Xen.

Virtual machine monitor 202 logically partitions hardware 200 into one or more virtual operating domains (or virtual machines) and an operating system (known as a "guest operating system") executes within each virtual operating domain. In order to provide virtual partitioning of hardware 200, virtual machine monitor 202 virtualizes processor 102, and can manage I/O to and from devices, such as display 108, keyboard 104, storage 114, and the like.

Figure 3:
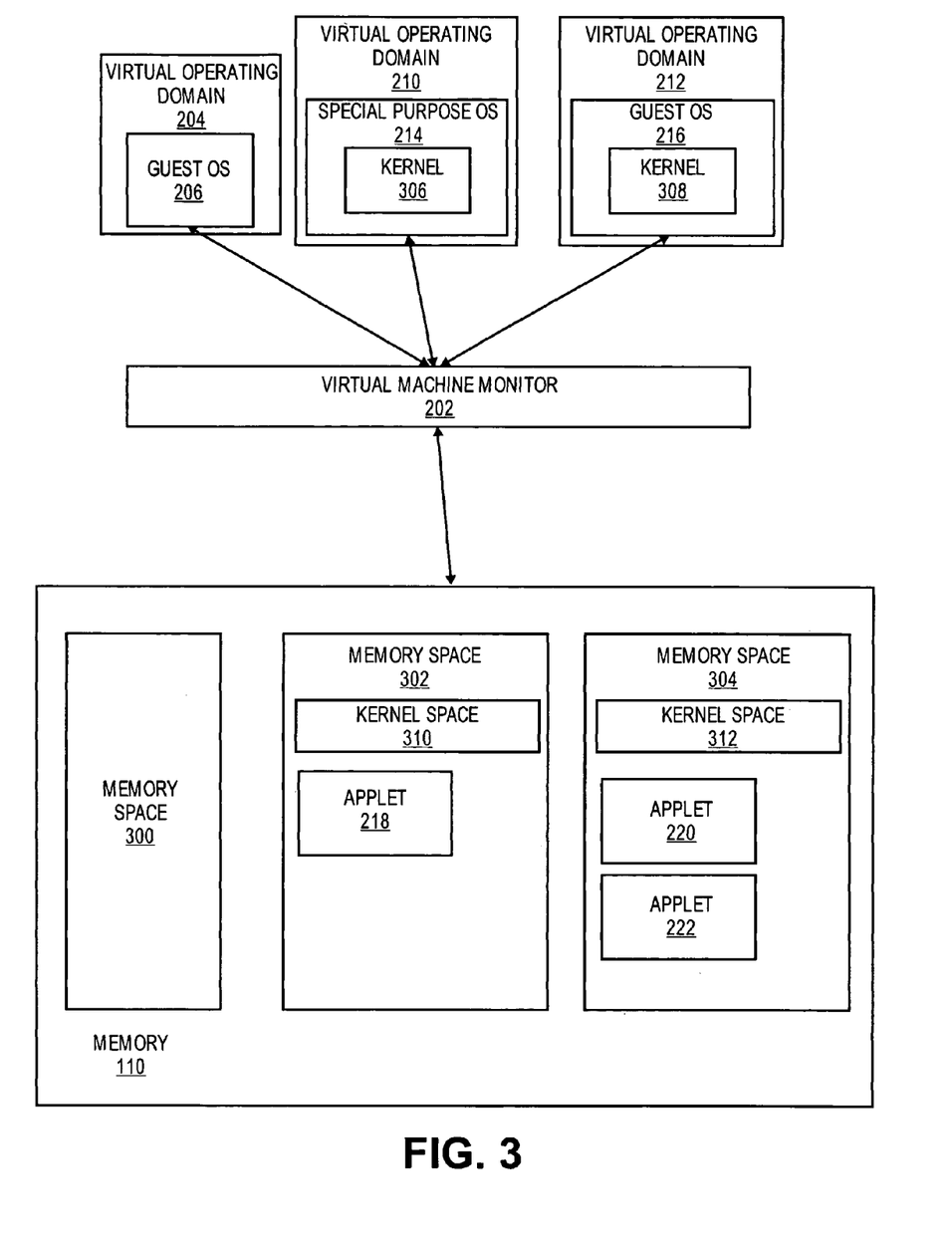
FIG. 3 illustrates a relationship between the memory, the virtual machine monitor, and the operating systems shown in FIG. 2.

In addition, virtual machine monitor 202 also provides management of memory 110. Accordingly, virtual machine monitor 202 may "virtualize" memory 110 into memory spaces 300, 302, and 304 for virtual operating domains 204, 210, and 212, respectively. For example, as shown, virtual machine monitor 202 may emulate physical memory using memory spaces 302 and 304 in memory 110 by translating physical addresses used by the virtual operating domain to those corresponding to memory spaces 302 and 304. As shown, for virtual operating domain 210, memory space 302 may have kernel space 310 allocated for kernel 306 of special purpose OS 214 and space for applet 218. Likewise, for virtual operating domain 212, memory space 304 may have kernel space 312 allocated for kernel 308 of guest OS 216 and space for applets 220 and 222.

In general, virtual machine monitor 202 may support any number of virtual operating domains and interface with a variety of known operating systems. Well known examples of operating systems that are consistent with the principles of the present invention include LINUX, MAC OS by APPLE INC., SOLARIS by SUN MICROSYSTEMS, WINDOWS by MICROSOFT CORPORATION, and the like.

For example, in FIG. 2, virtual machine monitor 202 is shown supporting virtual operating domains 204, 210, and 212. Virtual operating domain 204 is shown in which a guest OS 206, such as LINUX, MAC OS, or WINDOWS, can execute. Guest OS 206 may provide support for the execution of an application 208. Common examples for application are well known to those skilled in the art. For example, various user applications, such as a web browser, word processor, etc., may be implemented by embodiments of the present invention.

In addition, virtual machine monitor 202 may also provide one or more virtual operating domains for executing byte code interpreted applications, such as Java or C# applets. In FIG. 2, virtual operating domains 210 and 212 are provided to serve as examples of virtual operating domains and will now be further described.

Virtual operating domain 210 is created by virtual machine monitor 202 and provides an execution environment in which a user can efficiently run byte code interpreted applications. Special purpose OS 214 executes inside of virtual operating domain 210 and any number of applications may run on top of special purpose OS 214. In some embodiments, special purpose OS 214 is configured to support the running of one applet. By running inside its own virtual operating domain 210, special purpose OS 214 is provided a platform independent interface to hardware 200 and memory 110 via virtual machine monitor 202. In addition, when multiple Java applications or applets are running, each may be allocated a separate virtual operating domain to isolate them from each other and from the other guest operating systems.

Special purpose OS 214 may be predominantly software, but may also comprise partial or complete hardware implementations and firmware. Although FIG. 2 depicts several virtual operating domains, one skilled in the art will recognize that system 100 may implement any number of virtual operating domains.

In some embodiments, special purpose OS 214 is configured to optimally support the execution of applications written in a general purpose language that is translated into byte code rather than into machine code. For example, special purpose OS 214 may be configured to run applications or applets written in Java or C#. Since it is specifically designed for this purpose, special purpose OS 214 may be streamlined to include only those functions needed to support the byte code interpreter and the runtime of the programming language. In addition, in some embodiments, special purpose OS 214 incorporates a byte code interpreter within its kernel space in order to enhance its efficiency and speed. Alternatively, special purpose OS 214 may support an applet without a distinction between user level and kernel level spaces. Other aspects of special purpose OS 214 may differ from typical general purpose operating systems, such as LINUX and WINDOWS by MICROSOFT. Special purpose OS 214 is further described with reference to FIG. 5.

Applet 218 is a software component that runs on top of special purpose OS 214. In general, applet 218 may run inside the context of another program, for example a web browser, or through a plugin, or a variety of other applications that support an applet programming model. Of course, one skilled in the art will recognize that special purpose OS 214 may support running any type of raw applet.

Applet 218 may usually have some form of user interface or perform a particular piece of the overall user interface, such as in a web page. Common examples for applets 218 are Java applets, C# applets, and flash movies, and the like.

Virtual operating domain 212 may also be created by virtual machine monitor 202 to provide an execution environment in which a user can efficiently run byte code interpreted applications. As shown, guest OS 216 executes inside of virtual operating domain 210 and any number of applications may run on top of guest OS 216. In some embodiments, guest OS 216 is configured to support the running of multiple applets, such as applets 220 and 222. Guest OS 216 may be predominantly software, but may also comprise partial or complete hardware implementations and firmware.

Although FIG. 2 depicts several virtual operating domains, one skilled in the art will recognize that system 100 may implement any number of virtual operating domains. In some embodiments, guest OS 216 is configured to optimally support the execution of multiple applications written in a general purpose language that is translated into byte code rather than into machine code. For example, guest OS 216 may be configured to run applications or applets written in Java or C#. In some embodiments, guest OS 216 incorporates a byte code interpreter that is divided into a kernel component and user level component. The kernel component may execute within the kernel space of guest OS 216 in order to enhance its efficiency and speed. The user level component provides support for execution of an applet and couples the applet to the operating system. In addition, the kernel may share the same copy of the user level component of the virtual machine with multiple processes in the same virtual operating domain or across other virtual operating domains. The process and address space handling of guest OS 216 is further described with reference to FIG. 4.

As shown, guest OS 216 may be configured to support the execution of applets 220 and 222. Applets 220 and 222 (like applet 218) are software components that sometimes may run inside the context of another program (not shown), for example a web browser, or through a plugin, or a variety of other applications that support an applet programming model. Applets 220 and 222 may usually have some form of user interface or perform a particular piece of the overall user interface, such as in a web page. Applets 220 and 222 may also have the capability of interacting with and/or influencing their host program. Common examples for applets 220 and 222 are Java applets, C# applets, and flash movies, and the like. One skilled in the art will appreciate that embodiments of the present invention may also support applications that run on byte code generated from general purpose programming languages, such as Java or C#.

Figure 4:
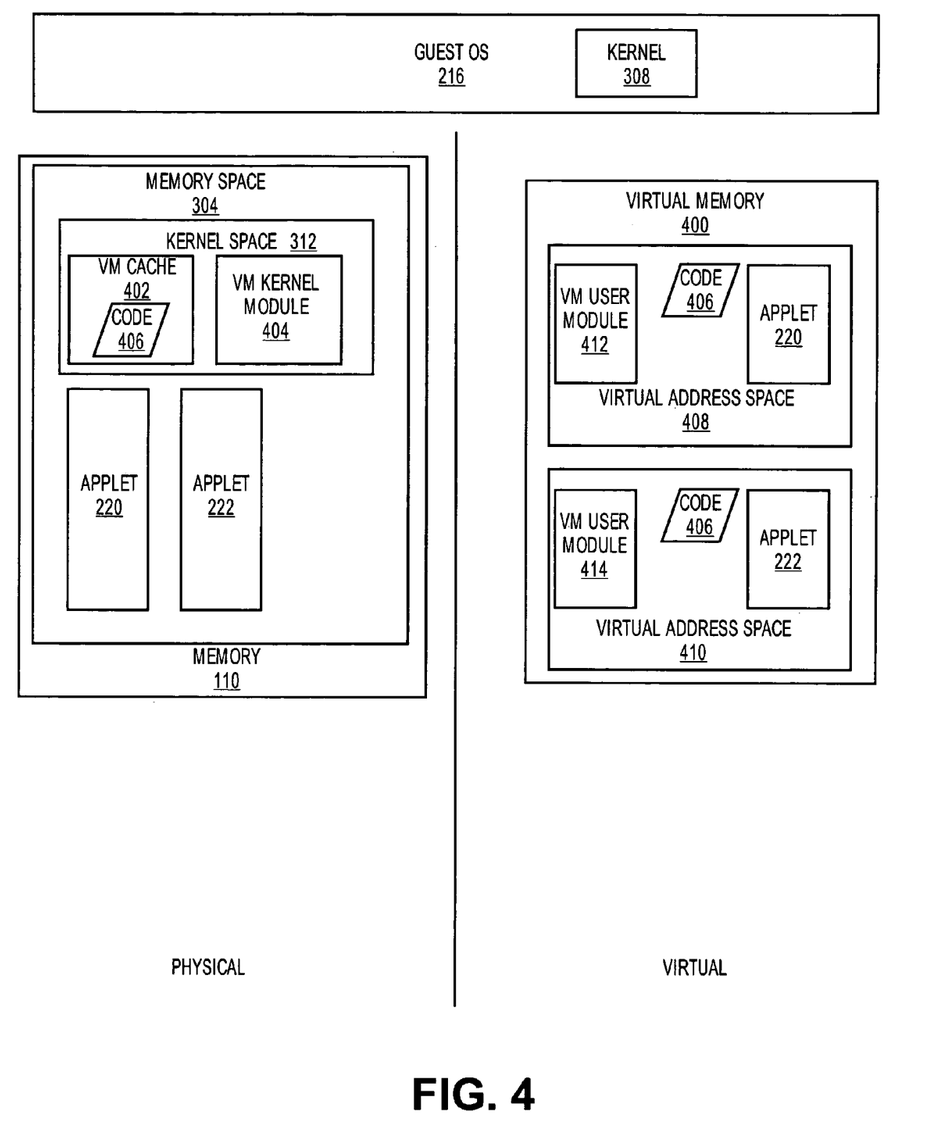
FIG. 4 illustrates the process and address space handling of one special purpose OS shown in FIG. 2.

Reference will now be made to FIG. 4 to illustrate the general relationship between memory space 304 in memory 110 and guest OS 216. As shown, guest OS 216 may support processes running applets 220 and 222. Accordingly, at least some portion of applets 220 and 222 are shown occupying memory space 304, which has been allocated to virtual operating domain 212 in memory 110. One skilled in the art will recognize that data for applets 220 and 222 may also be swapped in/out of memory 110 to/from other storage locations, such as storage 114.

Guest OS 216 may further comprise a kernel 308. Kernel 308 is the core of guest OS 216 and assists in providing access to memory space 304 and to the processes running on computer system 100, including the processes running applets 220 and 222. Kernel 308 may also provide low level services, such as thread management, address space management, direct memory access, interprocess communication, basic runtime libraries, and the like.

In some embodiments, kernel 308 may directly access or reside in kernel space 312 that is reserved for its use, device drivers supported by kernel 308, and any kernel extensions. Guest OS 216 may also employ virtual memory techniques for its process and address space handling. Virtual memory techniques allow processes to run in a memory address space that is independent of the physical constraints of memory space 304 or memory 110. Thus, guest OS 216 may use virtual memory techniques to map virtual address ranges used in processes (such as the processes running applets 220 and 222) to the physical addresses used in memory space 304.

As noted, applets 220 and 222 are software components that sometimes may run inside the context of another program (not shown), for example a web browser, or through a plugin, or a variety of other applications that support an applet programming model. Common examples for applets are Java applets, C# applets, and flash movies, and the like. One skilled in the art will appreciate that embodiments of the present invention may support applications that run on byte code generated from general purpose programming languages, such as Java or C#.

In some embodiments, the process and address space handling of guest OS 216 allows for the sharing of class runtime representations across multiple processes executing applets or across multiple virtual operating domains, such as virtual operating domain 210, using an inter-domain communication channel provided by virtual machine monitor 202. When code is generated and loaded for one application or applet, another application or applet can use that information without having to engage in file fetching, parsing, and verifying. For example, in some embodiments, a byte code interpreter may comprise two basic components to implement a virtual machine (VM) for executing the byte code of applets. One component of the byte code interpreter (a "VM kernel module") may reside in kernel space 312. A second component (a "VM user module") may be mapped into user-level processes.

In some embodiments, guest OS 216 may provide a byte code interpreter that implements a VM using VM kernel module 404 and VM user modules 412 and 414. VM kernel module 404 may reside in kernel space 310 and may be responsible for generating and loading the byte code generated for a general purpose programming language, such as Java or C#. VM kernel module 404 may also comprise a just-in-time (JIT) compiler (not shown). The JIT compiler allows VM kernel module 404 to translate bytecode into native machine code at runtime. The JIT compiler may compile bytecode on a per-file or per-function basis.

In contrast, VM user modules 412 and 414 are user-level components of the byte code interpreter that reside in the same virtual address space as the applet. Thus, FIG. 4 shows VM user modules 412 and, 414 residing in virtual address spaces 408 and 410, which have been created for applets 220 and 222, respectively. VM user modules 412 and 414 serve as the portion of the VM that executes byte code for an application or applet. In some embodiments, VM user modules 412 and 414 execute in separate address spaces of virtual memory used by guest OS 216. However, VM user modules 412 and 414 may use one or more of the same portions of physical memory 110. One benefit of this architecture is that VM user modules 412 and 414 may be located in the same locations of physical memory 110 for their respective processes and used across several processes even if they are running in different virtual operating domains.

Guest OS 216 may also provide a VM cache 402 in kernel space 312 to assist the operations of the byte code interpreter. In some embodiments, information across processes executing applets can be shared using VM cache 402. For example, VM cache 402 may hold runtime representation of loaded classes and dynamically generated native code. Over time as different applications and applets load and generate code, VM cache 402 eventually becomes filled with classes and compiled native code that are most frequently used. VM cache 402 may be implemented as an extension of a file system cache, which is well known to those skilled in the art.

In some embodiments, VM cache 402 allows VM kernel module 404 to preserve and reuse the code generated from a JIT compiler, such as code 406. Thus, in these embodiments, VM kernel module 404 may avoid repetitive runs of the JIT compiler, if the same code is used in more than one applet. For example, as shown in FIG. 3, VM cache 402 is shown holding applet code 406, which has been shared with applets 220 and 222.

One skilled in the art will recognize that this reduces the startup cost of an applet since all that has to happen at startup is that code that is cached in VM cache 402 can be quickly mapped to the applet's stack. Control is then transferred to the respective VM user module that operates as a user level process.

If the code is not found in VM cache 402, then VM kernel module 404 may load and build the requested code and then store it in VM cache 402 for the benefit of subsequent applets. Over time, VM kernel module 404 can easily make available a broad set of classes and compiled methods. Therefore, the exemplary process described below effectively amortizes the class loading and dynamic compilation costs of starting new applets. Various examples of the process are also described with reference to FIGS. 6-7.

Figure 5:
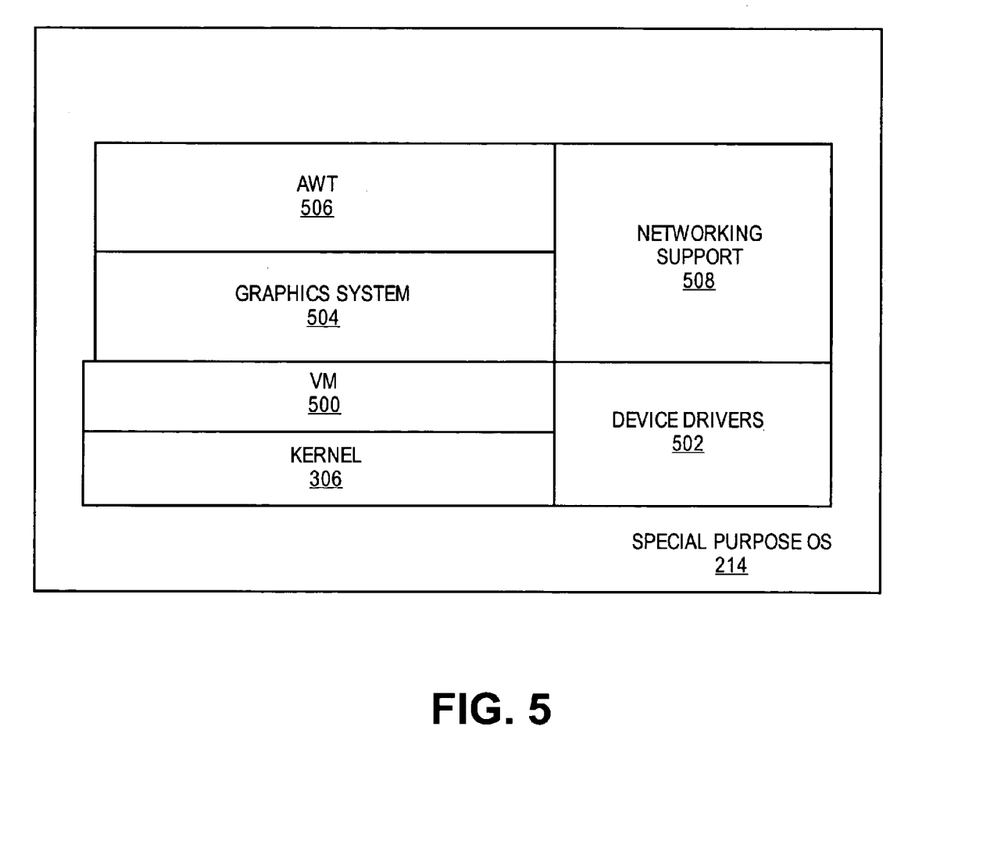
FIG. 5 illustrates an exemplary architecture of a special purpose OS that is in accordance with embodiments of the present invention.

FIG. 5 illustrates an exemplary architecture of special purpose OS 214 that is in accordance with embodiments of the present invention. As noted, special purpose OS 214 may be streamlined in various ways to optimally support byte code interpreted applications, such as applet 218. One example of a streamlined architecture for special purpose OS 218 will now be described.

Kernel 306 serves as the core of special purpose OS 214 and is provided access to hardware 200 and memory 110 via virtual machine monitor 202. In some embodiments, kernel 306 is implemented as a streamlined or partial kernel. Kernel 306 may be streamlined to provide a very simple abstraction comprising a small set of primitives or system calls that implement low level services, such as thread management, address space management, direct memory access, and inter-process communication. As noted above, kernel 306 accesses hardware 200 through a platform independent interface provided by virtual machine monitor 202. Thus, kernel 306 may operate with virtually any platform by relying on the interface provided by virtual machine monitor 202.

In addition, kernel 306 may implement a virtual machine 500 of the second type in its address space. Virtual machine 500 runs on top of kernel 306 and its primary function is to interpret and execute byte code generated from a program written in a general purpose language, such as Java or C#. For example, virtual machine 500 may be implemented as a Java Virtual Machine or C# virtual machine, which are well known to those skilled in the art.

As also shown, special purpose OS 214 may include other components that are tailored for a particular environment. Each of these components are functionally independent of each other and may be added or omitted depending on the needs of the intended environment. For example, if computer system 100 performed a substantial amount of operations with a network, such as the Internet, then special purpose OS 214 may include a fuller set of components. However, if computer system 100 were a more limited device or performed only limited tasks, then special purpose OS 214 may appropriately include fewer components. Some of the components that are likely to be found in special purpose OS 214 will now be described.

Device drivers 502 are used to enable communications between special purpose OS 214 and hardware 200, such as display 108, and keyboard 104. In some embodiments, device drivers 502 leverage the platform independent interface provided by virtual machine monitor 202 and, thus, are implemented as virtual device drivers. This includes device drivers that require the capability to directly address addresses in memory space 302 of memory 110 and to handle device interrupts.

Graphics system 504 provides basic graphics functions required to manage display 108 and provides a foundation for the Abstract Windowing Toolkit (AWT). AWT 506 provides applet 218 a wide range of graphics capabilities including an ability to draw geometric objects, render fonts, and control and display cursors on display 108.

Networking module 508 provides support for network communications. For example, networking module 508 may provide support for transport control protocol (TCP), user datagram protocol (UDP), or higher-level protocols like network information service, network file system, domain name service, and simple network management protocol.

Figure 6:
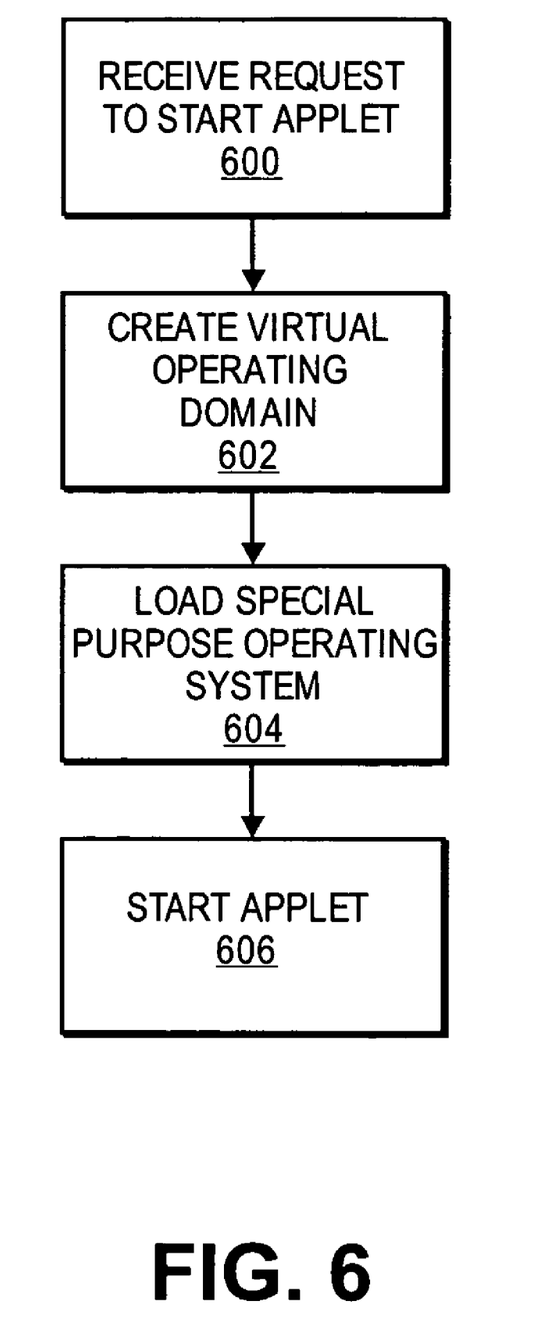
FIG. 6 illustrates an exemplary process flow for starting an applet on the computer system that is in accordance with embodiments of the present invention.

FIG. 6 illustrates a process flow for starting an applet on computer system 100. In particular, an exemplary process flow for starting an applet in a new virtual operating domain will now be described. In stage 600, system 100 receives a request to start an applet, such as a Java or C# applet. For example, application 208 may pass a request to guest OS 206. Processing may then flow to stage 602.

In stage 602, guest OS 206 passes the request for a new applet to virtual machine monitor 202 and instructs it to create another virtual operating domain. In particular, virtual machine monitor 202 may create a domain, like virtual operating domain 212. Processing may then flow to stage 604.

In stage 604, virtual machine monitor 202 determines that the request is for an applet and, thus, loads an operating system into virtual operating domain 212. This operating system may be configured like guest OS 216 and may contain a byte code interpreter in its kernel. Subsequently, guest OS 216 may perform its startup sequence. The applet, such as applet 220 or 222, itself may then be loaded.

In stage 606, guest OS 216 may then start applets 220 or 222 in virtual operating domain 212. Applets 220 and 222 may then perform its operations. Processing may then conclude or repeat again at stage 600 if another applet is requested. One skilled in the art will also recognize that the process described with reference to FIG. 4 not only applies to applets, but may also apply to applications, such as Java applications and C# applications.

Figure 7:
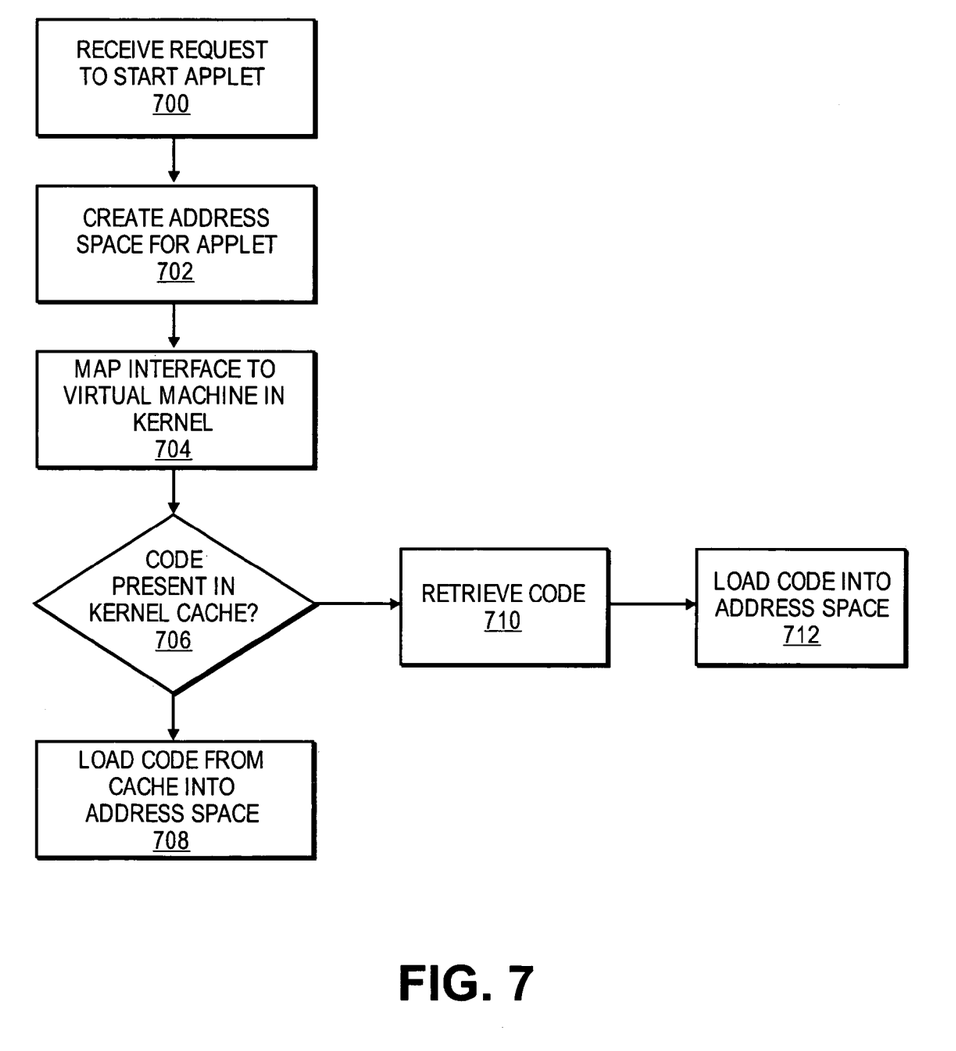
FIG. 7 illustrates another exemplary process flow for starting an applet on the computer system that is in accordance with embodiments of the present invention.

FIG. 7 illustrates a process flow for starting an applet on computer system 100. In particular, an exemplary process flow for starting an applet in an existing virtual operating domain will now be described. In stage 700, system 100 receives a request to start an applet, such as a Java or C# applet, in an existing virtual operating domain. For purposes of explanation, it is assumed that virtual operating domain 212 is currently running on system 100 and that the request relates to starting applet 220. The request is eventually passed to VM kernel module 404. Processing may then flow to stage 702.

In stage 702, VM kernel module 404 instructs kernel 308 to create virtual address space 408 in virtual memory 400 for applet 220. In stage 704, kernel 308 interfaces VM user module 412 with VM kernel module 404 in response to the request to start applet 220. As noted above, VM user module 214 operates in virtual address space 408 of applet 220. Processing may then flow to stage 706.

In stage 706, VM kernel module 404 determines whether code for applet 220 is present in VM cache 402. Alternatively, guest OS 216 may contact virtual machine monitor 202 to search for the code in other virtual operating domains, such as domains 204 or 210. If the code is found in VM cache 402 or in another virtual operating domain, then processing may flow to stage 708. If the code is not found, then processing may flow to stage 710.

In stage 708, VM kernel module 404 loads the appropriate code for applet 220 from VM cache 402 into virtual address space 408 of applet 220. Alternatively, virtual machine monitor 202 may provide VM kernel module the appropriate code from another virtual operating domain using an inter-domain communication channel. Of note, VM kernel module 404 is able to efficiently locate and load this code because it is at the same address in memory space 304 or in physical memory 110 from prior uses. VM user module 412 may then retrieve the code and perform the operations for starting and executing applet 220 as a user level process.

In stage 710, VM kernel module 404 retrieves the code, for example, remotely via a network or from a file stored on storage 114. As noted, VM kernel module 404 may then store this newly retrieved code into VM cache 402 for the benefit of other applets that may request it. If needed, this caching allows the code to stored at one location in memory space 304 or in physical memory 110. In addition, it also allows it to be shared across multiple processes executing in user space of virtual memory 400 or across other virtual operating domains. Processing may then flow to stage 712.

In stage 712, VM kernel module 404 loads the code into the address space of applet 220 in virtual address space 408. VM user module 412 may then retrieve the code and perform the operations for starting and executing applet 220 as a user level process.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of starting an applet on a computer in an existing virtual operating domain that accesses hardware of a computer through a virtual machine monitor, said method comprising:
    receiving a request to start the applet in the existing virtual operating domain, wherein an operating system runs in the existing virtual operating domain, and a kernel component of a byte code interpreter resides in a kernel space of the operating system;
    loading code for the applet from a second virtual operating domain by the kernel component of the byte code interpreter, wherein the second virtual operating domain is identified as containing the code that was previously loaded for another applet and accesses, independently from the existing virtual operating domain, the hardware of the computer through the virtual machine monitor; and
    starting the applet in the existing virtual operating domain using the code.

2. The method of claim 1, wherein receiving the request to start the applet comprises receiving a request to start a Java applet.

3. The method of claim 1, wherein receiving the request to start the applet comprises receiving a request to start a C# applet.

4. The method of claim 1, wherein starting the applet further comprises:
    creating an address space for the applet in a user space provided by the operating system; and
    starting the applet in the address space.

5. The method of claim 1, further comprising:
creating an address space for the applet in a user space provided by the operating system;
executing a user component of the byte code interpreter in the address space;
interfacing the user component of the byte code interpreter to the kernel component of the byte code interpreter in the existing virtual operating domain; and
starting the applet in the address space based on the code by the user component of the byte code interpreter.

6. The method of claim 5, wherein the kernel component of the byte code interpreter shares the user component of the byte code interpreter with at least one other virtual operating domain.

7. A method of starting an applet on a computer in an existing virtual operating domain that accesses hardware of the computer through a virtual machine monitor, said method comprising:
receiving a request to start an applet in the existing virtual operating domain, wherein an operating system runs in the existing virtual operating domain, and a kernel component of a byte code interpreter resides in a kernel space of the operating system;
communicating the request to start the applet through an inter-domain communication channel of the virtual machine monitor to the existing virtual operating domain;
identifying a second virtual operating domain that contains code for the applet, wherein the code was previously loaded for another applet; and
providing the code contained in the second virtual operating domain through the inter-domain communication channel to the kernel component of the byte code interpreter in the existing virtual operating domain, wherein the existing virtual operating domain and the second virtual operating domain independently access the hardware of the computer through the virtual machine monitor.

8. The method of claim 7, wherein receiving the request to start the applet comprises receiving a request to start a Java applet.

9. The method of claim 7, wherein receiving the request to start the applet comprises receiving a request to start a C# applet.

10. The method of claim 7, further comprising starting the applet in a user space provided by the operating system running in the existing virtual operating domain.

11. The method of claim 7, wherein the code comprises compiled native code.

12. A method of starting an applet on a computer in a new virtual operating domain, wherein the new virtual operating domain accesses hardware of the computer through a virtual machine monitor, the method comprising:
receiving a request to start the applet;
creating the new virtual operating domain for the applet;
loading an operating system in the new virtual operating domain, the operating system comprising a kernel component of a byte code interpreter for loading the applet, wherein the kernel component resides in a kernel space of the operating system;
identifying an existing virtual operating domain that contains code for the applet, wherein the code was previously loaded for another applet; and
providing the code contained in the existing virtual operating domain to the kernel component of the byte code interpreter in the new virtual operating domain, wherein the new virtual operating domain and the existing virtual operating domain independently access the hardware of the computer through the virtual machine monitor.

13. The method of claim 12, further comprising starting the applet in a user space provided by the operating system running in the new virtual operating domain.

14. The method of claim 12, wherein the code comprises compiled native code.

15. A computer comprising:
a processor;
a virtual machine monitor coupled to the processor and configured to provide a set of virtual operating domains;
an operating system encapsulated within a first virtual operating domain of the set of virtual operating domains, wherein the first virtual operating domain is coupled to the processor through the virtual machine monitor; and
a kernel component of a byte code interpreter residing in a kernel space of the operating system in the first virtual operating domain, wherein the kernel component is configured to load code for an applet from a second virtual operating domain of the set of virtual operating domains, wherein the second virtual operating domain is identified as containing the code that was previously loaded for another applet, and wherein the first and second virtual operating domains independently access hardware of the computer through the virtual machine monitor.

16. The computer of claim 15, further comprising:
a user component of the byte code interpreter residing in an address space in the first virtual operating domain and separate from the kernel space, wherein the user component is coupled to the kernel component of the byte code interpreter and configured to start the applet in the address space using the code.

17. The computer of claim 16, wherein the kernel component of the byte code interpreter shares the user component of the byte code interpreter with at least one other virtual operating domain of the set of virtual operating domains.

18. The computer of claim 15, wherein the kernel component of the byte code interpreter is further configured to load the code through an inter-domain communication channel of the virtual machine monitor.

19. The computer of claim 15, wherein the code comprises compiled native code.

* * * * *